Oct. 19, 1937.　　　F. E. JOHNSON ET AL　　　2,096,043
VEHICLE DOOR CONTROL SYSTEM
Filed July 7, 1936　　　4 Sheets-Sheet 1

INVENTOR.
Frank E. Johnson
Edward G. Parvin
John H. Vander Veer
BY
ATTORNEY

Patented Oct. 19, 1937

2,096,043

UNITED STATES PATENT OFFICE 2,096,043

VEHICLE DOOR CONTROL SYSTEM

Frank E. Johnson, Rahway, John H. Vander Veer, Westfield, and Edward G. Parvin, Roselle, N. J., assignors to National Pneumatic Company, New York, N. Y., a corporation of West Virginia Application July 7, 1936, Serial No. 89,432

30 Claims. (Cl. 105—341)

This invention is concerned with control systems for power operated doors on vehicles and the like with special reference to safety features.

A broad object of this invention is to provide a delayed control arrangement including means mounted on the power operated doors which remains energized to influence the control system of the power operators for the doors for a predetermined period after the vehicle begins to move.

More specifically the control system for the door operators involves in turn a control device which after the expiration of a predetermined period of time, the attainment of a particular vehicle speed, or the occurrence of some condition in connection with the operation of the vehicle, operates to render the door operator control system inoperative, but prior to that time maintains it alive so that it may carry out its intended function in the event that a person is caught in the vehicle doors.

It is noted that the delay feature of this invention does not involve a fixed period of time delay since those skilled in the art will appreciate that such an arrangement would not be practical. In accordance with this invention the delay period is variable in length. For example, in the system as applied to street cars the delay period, that is the period during which the reversing mechanism for the doors remains energized after the doors are closed, is determined by the time it takes the driving motors for the car to accelerate to a predetermined speed. This insures that the reversing device for the doors remains energized after they are closed and until the car reaches a predetermined speed which may, it is apparent, involve a widely varying period of time. In the case of the application of the invention to a motor bus the time during which the reversing mechanism for the doors remains energized after they are closed is terminated by the movement of the gear shift lever from low to second speed. This obviously involves a variable time period. Likewise in the case of the application of the invention to elevators the control is somewhat similar to that of the street car in that when the driving motor for the elevator attains a predetermined speed the reversing mechanism for the doors is deenergized.

There are many other objects of this invention but these will all become clearly apparent from the following detail description of several forms of system embodying the features of this invention.

The system is adapted to application on all types of vehicles such as railway, subway and street cars, automobile buses, and the like.

This invention resides substantially in the combination, construction, arrangement and relative location of parts, all as will be set forth in necessary detail to acquaint those skilled in the art with the nature thereof.

In the accompanying drawings—

Fig. 8 is a diagrammatic layout of a system in accordance with this invention as applied to street cars and the like.

It is common practice at the present time in the operation of passenger vehicles employing motor operated doors, to provide control means therefor including mechanism mounted on the door which is operated in the event that the doors strike a person or object in closing to reverse the operation of the doors to cause them to open. In order to prevent the accidental opening of such doors after they are fully closed it is common practice to deenergize the control system just as the doors approach closed position, so that they may not be accidentally or even intentionally opened by a passenger while the vehicle is in motion. With such arrangements it is possible for a passenger to have his arm, for example, caught in the door at the time the control mechanism for the door operators is deenergized, with the result that the vehicle may begin to move and drag the passenger, or otherwise injure him, and subject him to the possibility of loss of life or limb.

The prime object of this invention is to provide mechanism for maintaining the control circuits of the door operators alive and operable even after the vehicle begins to move, and for a sufficient time so that if a person or object is caught in the doors they may open to release the person or object. However, the period during which the circuits are maintained alive after the vehicle is in motion is terminated by mechanism interconnected with or controlled or influenced by the movement of the vehicle, or some operation incident to its initial acceleration.

Figure 1:
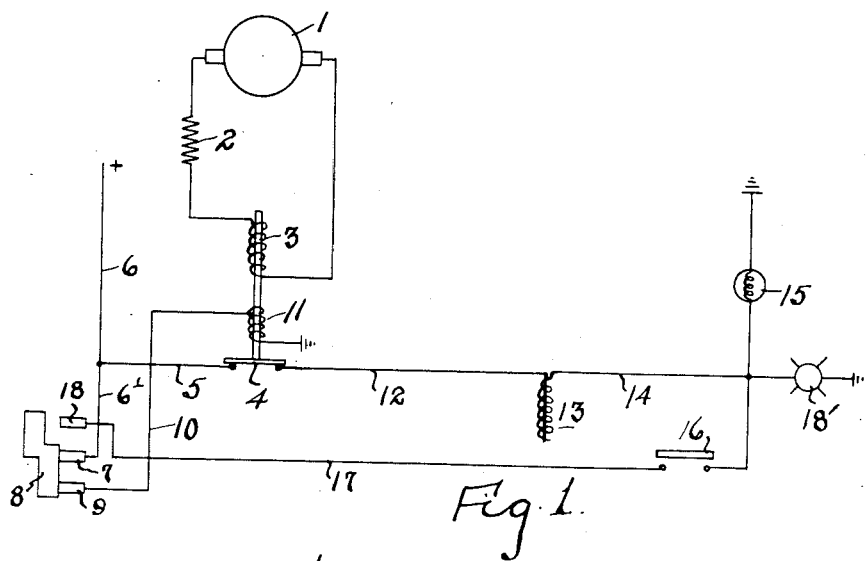
Figure 1 is a diagrammatic illustration of one form of system embodying the principles of this invention as applied to an electric motor driven vehicle.

To more fully appreciate the nature of the invention detailed reference will be made to the drawings. The system of Figure 1 is particularly adapted for use on vehicles driven by an electric motor such as street, subway, and railway cars. The armature of one of the main propelling motors of the car is shown at 1. It is connected in circuit through a suitable resistance 2 to a solenoid magnet winding 3 forming part of the relay switch 4. This switch is provided with a pair of contacts one of which is connected to wire 6 by means of wire 5. Wire 6 is intended to be connected to any suitable current source one terminal of which is grounded. The other contact of the relay switch is connected by wire 12 to one contact of a door reversing switch 13. The door reversing switch is now known in many forms, but for purposes of disclosure it may be noted that it can be of the construction illustrated in United States Patent No. 1,533,106 dated April 14, 1925 in the name of Paris R. Forman. Such a switch as shown in that patent is normally mounted on the forward edge of the door to be controlled thereby, and is commonly known in the art as providing, a "sensitive edge" door. It is this switch which is normally de-energized in the present system just as the door approaches closed position so that it may not close the reversing circuits to cause the door to open. It is this switch and its circuits which this invention seeks to maintain energized for a suitable period after the door is completely closed so that if by chance a person is caught in the door it will open to release him even though the vehicle has started to move. The other contact of switch 13 is connected by wire 14 to the grounded winding of magnet valve 15. This magnet valve may take any one of a number of suitable forms now known in the art, and is of a construction so that when the winding is energized pressure fluid is supplied to the pressure fluid operated engine which is connected to the door to cause the door to open. When the winding is de-energized the valve controls the supply of pressure fluid to the engine in a manner so that the engine closes the door.

For the purpose of further discussing one manner of using this invention it is to be assumed that this system is to be applied to a one-man street car for example, and that the magnet valve 15 controls the engine which operates the rear door of the vehicle which is remote from the vehicle operator's station. Such a vehicle also has a power operated door adjacent the vehicle operator's station. Connected to this door is a door switch which has a movable contact 8 arranged to cooperate with three fixed contact fingers 18, 7 and 9. Contact finger 7 is connected by wire 6' to wire 6. Contact finger 9 is connected by wire 10 to a second winding 11 on the relay switch 4, which winding is opposed. Contact finger 18 is connected by wire 17 to one terminal of a treadle switch 16 mounted in the doorway adjacent the rear door. This treadle may be in the form of any one of a number of known treadle switches which are now commonly employed in the passageway of the rear door of a one-man street car.

The other terminal of this switch 16 is connected to the magnet valve 15, as shown, and to a signal device such as the lamp 18'. Winding 11 of the relay is not strong enough to cause the relay switch to open, but is strong enough to hold it open once it has been opened by the winding 3.

In the operation of this system when the street car comes to a stop the vehicle operator opens the front door which moves contact 8 from the position shown to a position where spring fingers 18 and 7 are interconnected through it. As a result current is supplied from the source through wire 6, wire 6', spring finger 7 contact 8, spring finger 18, and wire 17 to the treadle switch 16. If a person wishes to leave the street car through the rear door he approaches it and thus closes the treadle switch 16. Current then flows to ground through the winding of the magnet valve 15, so that pressure fluid is supplied to the engine controlled by it and connected to the rear door causing the door to open. Current also flows to the signal device 18' operating it. The movement of contact 8 from the door closed position shown in Fig. 1 to the door open position above described breaks the circuit from wire 6 to winding 11 so that relay switch 4 closes. Thus current is supplied from wire 6 through wire 5, switch 4, and wire 12 to switch 13, which of course is normally open. This switch, as stated above, is mounted on the edge of the rear door. When the passenger mentioned above leaves the vehicle, switch 16 opens as he steps off the treadle, deenergizing magnet valve 15 so that the engine connected to the rear door moves it to closed position and de-energizes device 18.

If for any reason a person is in the way of the door and is struck by it switch 13 closes again completing a circuit to the magnet valve 15 and signal device 18' through wire 14, causing the door to open or at least stop and begin a reversal in its direction of movement until switch 13 opens. As soon as switch 13 opens magnet valve 15 is again de-energized and the rear door begins to close. When all passengers at the front door have either left or boarded the car the operator closes the front door through mechanism not shown. This causes contact 8 of the switch connected to the front door to move back to the position shown in Fig. 1, disconnecting the treadle switch 16 from circuit, and connecting winding 11 in circuit through wire 10, spring finger 9, contact 8, spring finger 7, wire 6', and wire 6 back to the ground and source. The energization of winding 11 does not open switch 4 so that switch 13 still remains in control of a circuit to the magnet valve 15. The vehicle may begin to move, but if a person is caught in the door so that switch 13 is closed it may open to release him. This condition continues to exist until the vehicle reaches a speed which can be predetermined by proper design to a point where the current flowing in the armature circuit is sufficient to energize the winding 3 sufficiently to open switch 4. At this time switch 13 loses all control of the magnet valve and the rear door may not be opened, although ample opportunity has been afforded for freeing any passenger who might be caught in it. When switch 4 is opened winding 11 is strong enough to hold it open even if winding 3 becomes completely deenergized, as is the case when the vehicle is being brought to the next stop. However, switch 4 will not close again until the vehicle operator opens the front door when contact 8 will move to break the circuit to the winding 11 and the apparatus is then in condition to go through the previously described cycle of events.

Figure 2:
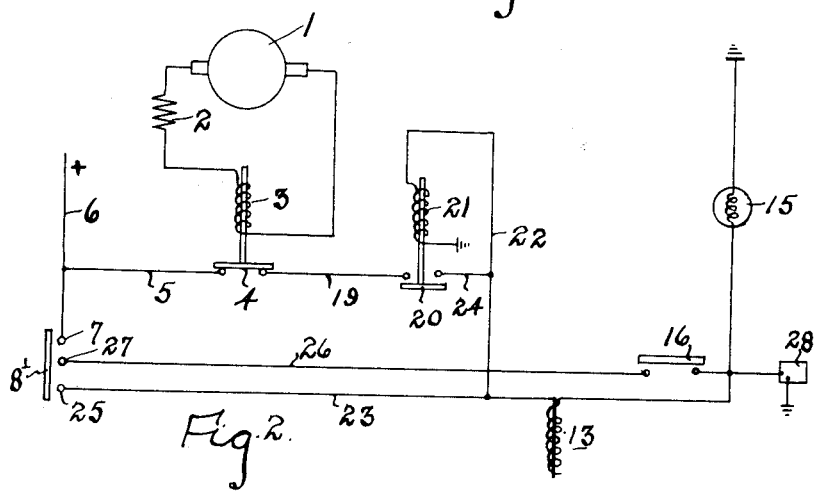
Fig. 2 is a similar view of a modified system.

The system of Fig. 2 may likewise be applied to an electric motor driven vehicle, but is in somewhat modified form. This system as before employs a control from the armature 1 for a relay switch 4, which this time has only the single winding 3 in circuit with the armature. Wire 6, as before, is connected by wire 5 to one contact of switch 4 and to the contact 7 of the front door switch which has a modified form of movable contact 8' as illustrated. The other contact of switch 4 is connected by wire 19 to one contact of another relay switch 20. The other contact of this switch is connected by wire 24 to wire 22, which is connected to the grounded operating winding 21 of this switch and to wire 23. Wire 23 is connected to contact 25 of the front door switch and to one contact of the rear door switch 13. This switch is mounted on the edge of the door as before, and is illustrated by the patent referred to above. The other terminal of switch 13 is connected to the grounded winding of the magnet valve 15 which controls the rear door engine as before. Contact 27 of the front door switch is connected to wire 26 through the rear door treadle switch 16 to the winding of the magnet valve 15 and the device 28, as before. The electromagnetically operated device 28 may be a signal device or an electric lock or switch to control some part of the vehicle, such as the brakes, the main controller and the like.

In the operation of this system when the vehicle operator opens the front door the contact 8' of the front door switch engages all of the contacts 7, 27 and 25. The rear door opens if there is a passenger standing on the treadle adjacent it by reason of the flow of current from the grounded source through wire 6, contact 7, contact 8', contact 27, wire 26, switch 16 and winding of magnet valve 15 and device 28 to ground.

At the same time when the front door switch closes current flows from contact 8' to contact 25 and then through wire 23, wire 22, and winding 21 to ground closing relay switch 20, relay switch 4 is already closed the vehicle being at a standstill so that current may also flow from wire 6 through wire 5, switch 4, wire 19, switch 20, and wire 24 to wire 22 to provide a holding circuit for the winding 21. The rear door will close when switch 16 opens as before and will reverse if it strikes an object so that switch 13 closes. Also when the vehicle operator closes the front door contact 8' will disengage all of the contacts 7, 27 and 25. However, relay switch 20 remains closed because of the holding circuit to the winding 21 with the result that the rear door switch 13 remains energized through the relay switches 4 and 20 until the vehicle attains a predetermined speed when the winding 3 will open the relay switch 4. Thus, until this event occurs, switch 13 may cause the rear door to open to permit the extrication of a person caught in it. It might here be noted what is true of the system of Fig. 1, that even when the vehicle is moving, as soon as the person extricates himself so that switch 13 opens the rear door closes even though switch 13 remains energized for a short period. As soon as winding 3 opens switch 4 the holding circuit to winding 21 is broken so that switch 20 is opened, deenergizing switch 13.

Figure 3:
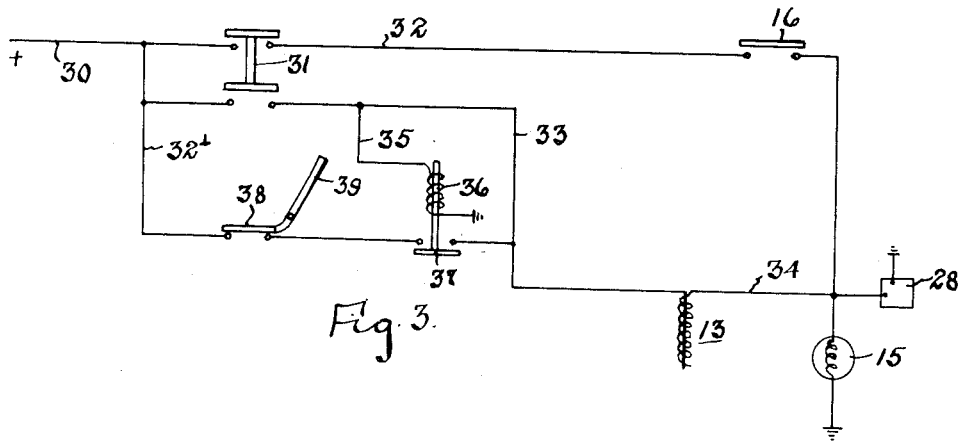
Fig. 3 is a diagrammatic view of a system embodying the principles of this invention as applied to a motor vehicle.

A modified system is shown in Fig. 3 for application to an automotive bus which is normally driven by a gasoline engine rather than an electric motor. In the system illustrated the circuit which maintains switch 13 energized after the vehicle gets in motion is operated by the gear shift lever so that when this lever is shifted to put the bus in second gear the switch opens to deenergize switch 13. In this system the front door switch is shown at 31 and is connected to it so as to move from the open position shown to a closed position when the front door is open. Wire 30 energizes two of the contacts of this switch from a suitable grounded current source, and is connected by wire 32' to one contact of a switch 38 operated by the gear shift lever 39. One of the other contacts of switch 31 is connected to the rear door magnet valve 15 by wire 32 and rear door treadle switch 16. The other contact of switch 31 is connected by wire 33 to one contact of the rear door switch 13. The other contact of this switch is connected by wire 34 to the winding of magnet valve 15 and device 28. A relay 37 has one of its contacts connected to the other contact of switch 38 and its other contact connected to wire 33. The operating winding 36 for the relay switch 37 is connected by wire 35 to wire 33. In the operation of this system when the vehicle comes to a stop the operator opens the front door. This closes switch 31. Current is thus supplied through its upper pair of contacts from wire 30 to wire 32, and from there to the rear door treadle switch 16. A passenger wishing to alight from the rear door of the bus will close switch 16 so that magnet valve 15 is energized to open the rear door. The closing of switch 31 also completes a circuit through the lower pair of contacts from wire 30 through wire 33 to switch 13 and through wire 35 to winding 36. This closes relay switch 37. Switch 38 is connected to the gear shift lever so that it is closed when the vehicle is at a standstill, and while it is operating in low gear. Therefore, if the operator closes the front door so that switch 31 opens, switch 13 is maintained energized, through switches 38 and 37 until the operator shifts into second gear. Until then switch 13 may cause the energization of the winding of magnet valve 15 to cause the door to open so that a person caught in it may free himself even though the vehicle has begun to move. With switches 38 and 37 closed it will be seen that a holding circuit to the winding 36 is maintained through wires 33 and 35. However, as soon as the operator shifts into second gear switch 38 opens, deenergizing winding 36 so that switch 37 opens deenergizing switch 13.

Figure 4:
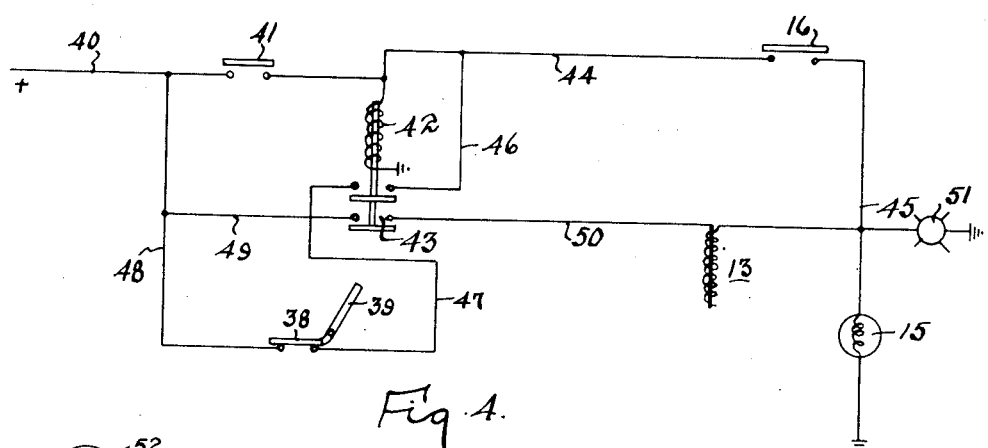
Fig. 4 is a similar view of a modification thereof.

Fig. 4 shows a modified arrangement for use on automotive buses. In this case the rear door magnet valve 15 and signal or other device 51 may be energized from the current source through wire 40, front door switch 41, which is closed when the front door is open, wire 44, rear door treadle switch 16, which is closed when a passenger wishes to leave the bus at the rear door, and wire 45. When switch 41 is closed the winding 42 of the relay switch 43 is energized so that this switch is closed. Thus the rear door edge switch 13 is energized through the lower pair of contacts by means of wires 49 and 50 so that the door may be reversed when switch 13 closes by reason of the energization of the winding of the magnet valve 15. The upper pair of contacts of the relay switch 43 provides a holding circuit for the winding 42 from wire 40 through wire 48, gear shift switch 38, wire 47 and wire 46. As before switch 38 only opens when the gear shift lever 39 is shifted to second gear position. Thus, even if the front door is closed so that switch 41 opens, switch 43 remains closed keeping switch 13 energized until the operator shifts into second gear. When this occurs switch 38 opens so that winding 42 is deenergized, removing current from switch 13.

Figure 5:
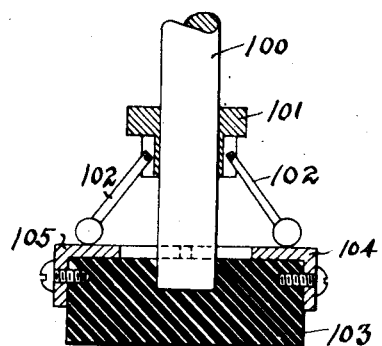
Figs. 5 and 6 are sectional and plan views respectively of a suitable form of centrifugal switch which may be employed in any of the systems of Figs. 1 to 4 inclusive.
Figure 6:
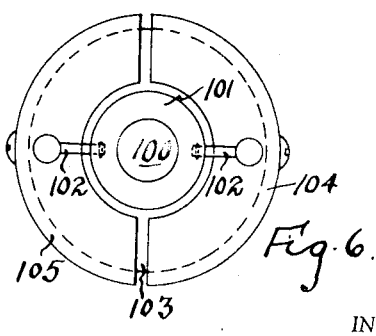

It is apparent that on both electric vehicles and on automotive vehicles other forms of switches or controls may be employed in place of the armature 1 of the former and the gear shift switch 38 of the latter. Thus a centrifugal switch could be employed on all forms of these vehicles operated from the axle for example. Such a switch is shown in Figs. 5 and 6 and would be connected in circuit with the winding 3 of the systems of Figs. 1 and 2, or the windings 36 and 42 of the systems of Figs. 3 and 4, respectively. This switch comprises a shaft 100 operated for example from the axle of the vehicle. Mounted on the shaft is a collar 101 secured to it and having pivotally mounted on it a pair of weighted contact arms 102. Secured to the shaft 100 for rotation with it is an insulating support 103 having a pair of contacts 104 and 105 secured thereto. These contacts are positioned to be engaged by the contact arms 102 until the speed of rotation of shaft 100 is sufficiently high to cause them to swing out away from the contacts under centrifugal force. As is commonly employed with such centrifugal switches a pair of swings may be employed to determine at what speed the weighted contact arms 102 disengage the contacts 104 and 105. Where the insulating support 103 revolves with the shaft 100 some form of slip ring commutator would be necessary to make the circuit to the contacts 104 and 105. It is not necessary however to have the support 103 revolve, although this is the preferable arrangement.

With the use of such a switch the period during which switch 13 would remain energized after the vehicle started would be determined by the rate of acceleration of the vehicle. It is of course apparent that many other modified arrangements can be employed to attain the general object of this invention.

Figure 7:
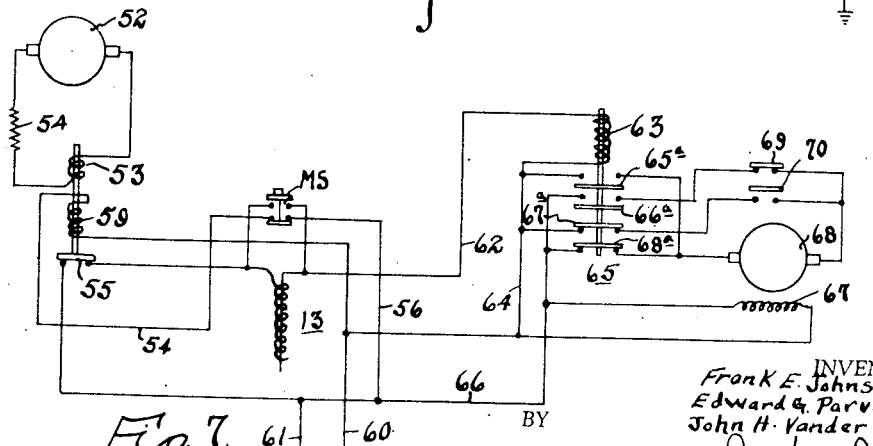
Fig. 7 is a diagrammatic layout illustrating one form of door control system embodying the principles of this invention as applied to elevators.

Fig. 7 diagrammatically illustrates the application of this invention to elevators. At 52 is diagrammatically shown the main driving or operating motor for the elevator. The armature of this motor is connected in series through a suitable resistance 54 to a magnet or solenoid winding 53 which operates the relay switch 55. The relay switch is also provided with a magnet or solenoid winding 59. One terminal of this winding is connected by wire 54 to a pair of normally closed contacts on the door motor switch MS. The other contact of this pair is connected by wire 56 to one of the power circuit wires 61 and to one of the contacts of the relay switch 55. The other contact of relay switch 55 is connected to one of the terminals of the door switch 13. Here, as before, this switch is mounted on the forward edge or edges of the elevator door in a position to be operated by any object caught between the doors when closing or engaged by them. The other terminal of this switch 13 is connected by wire 62 to one terminal of the magnet 63 of the relay switch 65. This relay switch is provided with four pairs of contacts and four contact members 65a, 66a, 67a, and 68a which cooperate with the contact pairs. Two of the contacts of two of the pairs are connected by wire 64 to wire 60 and to the other terminal of the winding 63. The other two contacts on the same side of the relay are connected by wire 66 to wire 61 and to one terminal of the field 67 of the door motor, the door motor in this case being an electric operator. The other terminal of the field winding 67 is connected to wire 60. The top and bottommost right hand contacts of the relay switch 65 are connected together and to the armature 68 of the door motor. The remaining right hand contacts of the relay switch 65 are connected by wires, as shown, to one of the contacts of each of the limit switches 69 and 70. The other contacts of these switches have a common connection to the other terminal of the armature 68. The other pair of contacts of the switch MS are connected across the door switch 13 and are provided to control winding 63 of the relay 65.

In describing the operation of this system it will be first noted that the mechanism is shown in door closed position. When the elevator car comes to a stop by a floor landing the main motor 52 is of course deenergized and hence there is no current in the coil 53. Relay switch 55 is open, however, since current flows through the winding 59 from supply wire 61 and through wire 56, the normally closed pair of contacts of switch MS, wire 54, winding 59, and back to the other power circuit wire 60. The winding 59 is proportioned so that when the current is flowing through it it is strong enough to hold switch 55 open, it of course having been previously opened as will appear later by energization of the winding 53 while the elevator was in operation. Thus winding 59 holds switch 65 open at the time the car comes to a stop.

To open the doors, either on the elevator or at the landing opening, or both, switch MS is operated so that the normally closed pair of contacts are opened and the normally opened pair are closed. The opening of the normally closed pair breaks the circuit to winding 59 so that relay 55 closes. Current then flows to the door motor as follows: From wire 61, through switch 55, the closed pair of contacts of switch MS, wire 62, winding 63, and wire 64 back to the other power circuit wire 60. The energization of winding 63 operates relay switch 65 to its other position where the two upper pairs of contacts make and the two lower pairs of contacts break. The making of the second highest pair of contacts completes a circuit to the armature 68 of the door motor as follows: From wire 61 to wire 66, contact disc 66a, closed limit switch 69, to the armature 68, from the armature 68 to the highest pair of contacts of relay 65, and thence by wire 64 back to wire 60. This sets the door motor in operation causing it or them to open the doors.

It is here noted that the limit switches 69 and 70, which are well known in the door operating art, are of the type such that they are alternately operated at the end of the stroke of the doors in either direction, and, at positions of the doors intermediate their end positions, both limit switches make contact. Thus switch 70 opens just as the doors reach their closing movement. This switch closes as soon as the doors begin to open and remains closed until the doors again fully close. Switch 69 opens just as the doors fully open and closes as soon as they start to close. It is the usual practice to interconnect the doors and the limit switches to effect this operation. Thus, when the doors are fully opened switch 69 opens but switch 70 is closed. Switch MS is held closed until it is desired to close the doors. At this time switch MS is released, opening the upper pair of contacts and closing the lower pair. This deenergizes winding 63 and relay switch 65 returns to the position in Fig. 7, breaking the upper pairs of contacts and making the lower pairs. It will be noted that the return of switch MS to the position shown in Fig. 7 energizes winding 59, but switch 55 does not open for the reason previously explained. With the return of relay switch 65 to the position shown in Fig. 7 connections to the armature 68 of the door motor are reversed in a manner apparent from the connections in Fig. 7 so that the doors are closed by the motor. Just as the doors close, as previously described, switch 70, which has been closed during the closing movement of the door, kicks open. This sets up the reverse connection so that the door motor may be energized to open the doors.

The principle of this invention as applied to this system now becomes apparent. Switch 55 remains closed and hence switch 13, which is in circuit with the winding 63, remains alive so that if switch 13 closes relay switch 65 operates to open the doors. As noted before, switch 13 closes if the door strikes an object or catches one in it in closing. Switch 13 remains alive until switch 55 opens. Switch 55 does not open until winding 53 is supplied with sufficient current to cause it to operate. This occurs only after the main elevator motor has been accelerated to a speed where the voltage at the brush holders of the armature, and on solenoid 53 in series with resistance 54, is sufficient to produce that result. When this happens switch 55 opens and then the closing of switch 13 will not cause the doors to open. Thus, if a person should be caught in the doors, and switch 13 is thus closed at any time up to the point where switch 55 opens, the doors will automatically open to release the person caught therein. This gives a safety period, so to speak, at the termination of which there is practically no likelihood of anyone being caught in the doors.

Figure 8:
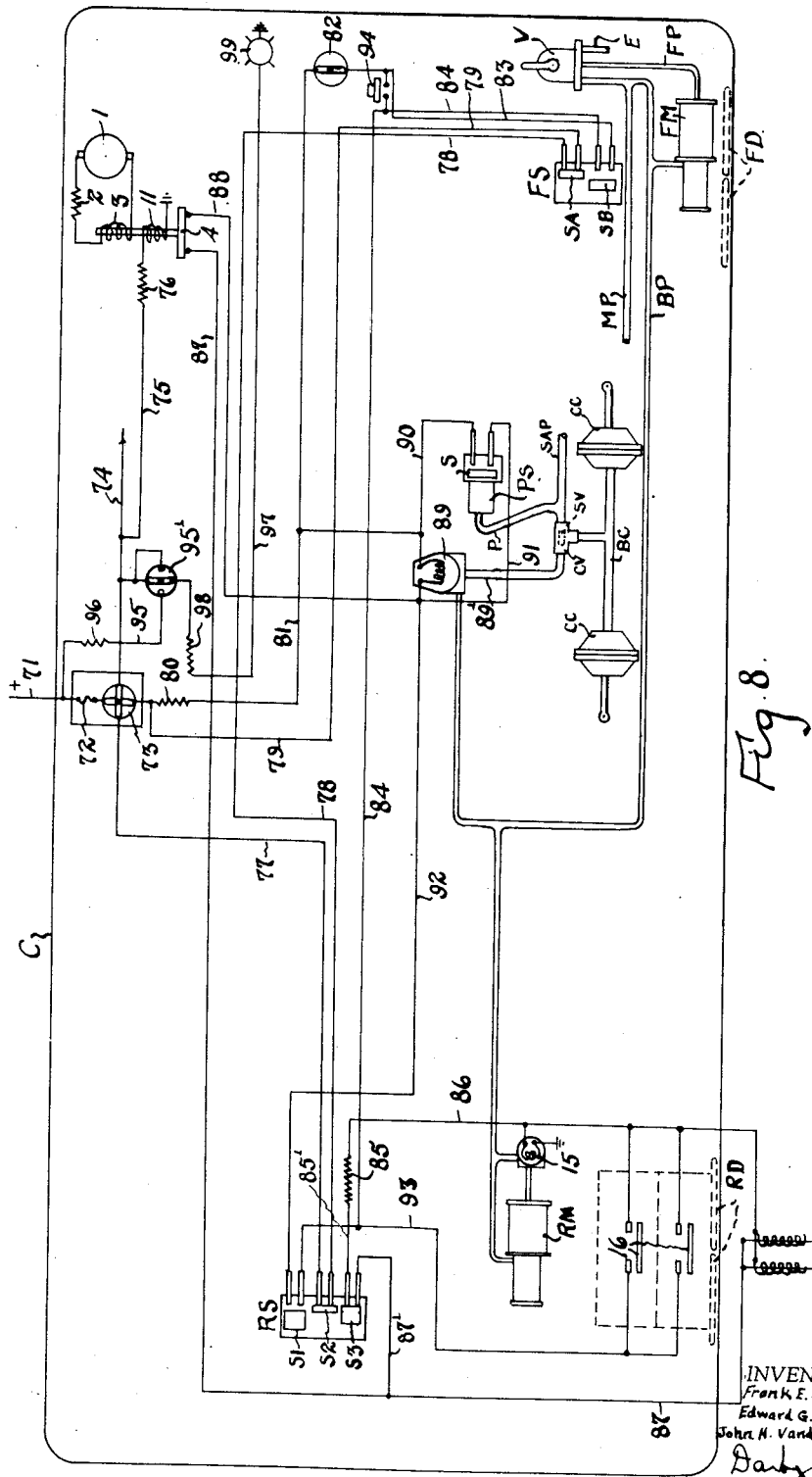

Fig. 8 discloses more completely the application of the principles of this invention to a "single end" surface car. The outline of the car car has been shown at C. The car has, since it is illustrated as a "single end" car, doors on only one side thereof. The front doors adjacent the vehicle operator are shown at FD and the rear doors are shown at RD. This invention has its real value in connection with one man operated cars, which point is emphasized since there is but one operator on the car and he is stationed of course adjacent the front door.

The power supply source is grounded at its negative terminal in accordance with the usual practice and connected at its positive terminal by the wire 71. On a trolley car it is usual to operate the traction motor control circuit by means of a circuit interlocked with the car doors. In Fig. 8 this circuit starts from the positive source of energy at switch 73 and goes via wire 79, contact segment SA of the front door switch FS, wire 78, contact segment S2 of the rear door switch RS, wire 77, and across bridge of switch 73 to wire 74 and the traction motor control apparatus, which is not here shown.

At 1 is shown one of the traction motor armatures, across the brush holders of which are connected in series the resistance 2 and the solenoid winding 3 of the relay 4. The solenoid 11 of relay 4 functions as a holding coil which is of sufficient power to hold relay 4 open after it has once been opened by solenoid 3. Solenoid 11 is fed from wire 74, described above, through wire 75 and resistance 76. It will therefore be energized whenever all doors on the car are closed. Therefore, after all doors on the car have been closed, relay 4 will remain in contact with wires 87 and 88 until the electromotive force across the brush holders of armature 1, acting through resistance 2 and solenoid 3, is sufficient to lift the disc of the relay 4. Relay 4 will then remain open until the supply of energy to solenoid 11 from wire 74 is again interrupted by the opening of one of the car doors.

The contacts S1, S2, and S3 form part of a drum switch RS which is connected with the rear doors and operated by them. This switch is shown in door closed position. It will be noted that in this position contact S2 interconnects wires 77 and 78, contact S3 interconnects wires 87' and 85', while contact S1 is out of engagement with its contact fingers. Contact S1 is of such length in the direction of its movement that once it makes contacts with its fingers it maintains the contact from the time the door begins to open until it is fully opened and back to almost closed position. Contact S2 only engages its fingers at the end of the closing stroke and while the door is closed. Contact S3 engages its fingers while the door is closed and maintains this contact until just as the door is fully opened, repeating this sequence in reverse as the door closes. The contacts SA and SB are part of the drum switch FS which is connected to the front doors. This is shown in door closed position. As soon as the door starts to open contact SA disengages its contact fingers, while contact SB engages its contact fingers and continues to engage them until the front door is just about fully closed.

The treadle switches 16 are mounted in the passageway to the rear doors RD. Several of these treadle switches can be mounted in the passageways to the door and/or additional treadle switches connected across the wires 93 and 86 may be mounted on the rear door step so that if a person is standing on the step or in the passageway to the door, or at both places, one or more of these switches will be closed.

The motor for operating the front doors is shown at FM and the motor for operating the rear doors is shown at RM. In the system disclosed these are differential fluid pressure operated motors. At MP is the main pressure fluid supply pipe from the source. It is connected by pipe BP to the port of each engine which feeds the smaller cylinder so that when the larger cylinders of these engines are opened to exhaust the door always moves to closed position. This is in accordance with well known practice. These motors cause the door to open when air is supplied to the large cylinders. The air or pressure fluid source always supplies air to the smaller cylinders.

Pipe MP extends to the manually operated valve V at the operator's station, and is also connected by pipe FP to the large cylinder of the motor FM. E is the exhaust pipe for the valve and motor. Pipe BP is connected to the large cylinder of the motor RM through the magnet valve 15. When this valve is deenergized the supply of air is cut off from the large cylinder, and the large cylinder is open to exhaust in accordance with the usual practice.

The airbrakes of the car are operated by the operator through pipes SAP and BC. These pipes are connected through the double check valve CV. When air pressure is applied to pipe SAP by the operator it forces shuttle SV of check valve CV against the opening in valve CV from pipe 89', thereby preventing escape of air from pipe SAP through pipe 89', and valve 89 to atmosphere. At the same time air passes through check valve CV from pipe SAP to pipe BC and the brake chambers CC. The pipe P of the spring return air switch PS is connected to the brake line SAP of the vehicle so that when the brakes are applied switch PS is operated to move contact S into engagement with its contact fingers. These fingers and contact S connect wires 90 and 91 to short circuit and thereby render inoperative the solenoid of valve 89.

But should electromotive force be impressed on the solenoid of valve 89 while the contact S of switch PS is not bridging wires 90 and 91, that is, while there is no air pressure in pipe SAP, said solenoid will operate valve 89 to cause air to flow from the source of supply BP through pipe 89' and check valve CV to pipe BC and the brake chambers CC. This in turn forces plunger SV against port in valve CV from pipe SAP and thereby prevents escape of air from pipes 89' and BC through pipe SAP.

All of the equipment illustrated in Fig. 8 is shown in operative and door closed position. It may be noted in passing that, when switch 73 is open, all of the control equipment is rendered inoperative, although if switch 95' is moved to its other position current can be supplied by wire 74 to the main motor controller to operate the vehicle. Under these conditions the rear door is dead and cannot be operated, while the front door can be opened and closed by the operator. However switch 95' is shown in normal position so that signal light 99 is energized, indicating that the rear door controller equipment is operative.

When the operator brings the vehicle to a stop he operates air valve V from neutral position to a position to interconnect pipes MP and FP. Air is supplied to the large cylinder of motor FM and it opens the front doors FD. As soon as these doors begin to open switch FS is operated so that contact SA breaks and contact SB makes. The breaking of contact SA breaks the circuit to the main motor, that is to wire 74.

Likewise, when contact SB makes current flows from switch 73 through resistance 80, wire 81, switch 82, wire 83, contact SB, wire 84, to wire 93, and hence to the treadle switches 16. This prepares the circuits for operation of the rear doors. If there is a person standing at them, as he will be if he wishes to alight from the vehicle, one or more of the switches 16 are closed. It is to be noted that switch 4 is closed. While the vehicle was in operation it was open. When the vehicle came to a stop it remained open since the winding 11 was energized from wire 74, it being assumed at this time that the front doors are closed. However, as soon as contact SA breaks, as the front doors begin to open, the circuit to wire 74, as we previously described, is broken and hence winding 11 is deenergized. When switch 4 closes, a circuit is established from source 71 through fuse 72, switch 73, resistance 80, wire 81, wire 90, the solenoid of valve 89, or contact 3 of switch PS if this is in the operated position, wire 88, the contact disc of relay 4, wire 87 to wire 87', contact 53 of switch RS, wire 85', resistance 85, wire 86, and the solenoid of valve 15 to the negative side of the current supply. This circuit does not operate the solenoids of valves 89 and 15, because the value of resistance 85 is such that this current is insufficient to cause these solenoids to operate their respective valves. Also, the closing of switch 4 energizes switches 13 from wire 87 as above, so that should one of these switches be operated, a circuit is completed from said switch to wire 86 to the solenoid of valve 15.

When the brakes were applied to bring the vehicle to a stop switch PS operated to close switch S, thus cutting out the operation of solenoid of valve 89. Contact SB of the front door switch FS having made and one or more of switches 16 being closed, current flows to ground through the winding of magnet valve 15 operating it to connect the large cylinder of motor RM to pipe BF. The rear doors begin to open, and as they do S2 breaks and S1 makes. The breaking of the circuit at S2 merely provides an interruption of the circuit to the main motor controller connected to wire 74 at the rear door. Thus it might be noted here, even if the front doors are closed the vehicle cannot be started as long as the rear door is open. As the rear door begins to open contact S1 also makes so that current flows through wires 81 and 90, switch S, wire 91, wire 92, switch S1, and wire 93 to the treadle switches 16. The purpose of this circuit is such that if the other circuit to it through wire 84 and switch SB is broken by the closing of the front door, treadle switches 16 will remain energized.

As stated before, S1 closes the circuit between wires 92 and 93 as soon as the door begins to open and holds it closed until the doors again just reach closed position. The rear doors continue to open until fully opened, even if the circuit through switch 16 is interrupted, for the solenoid of valve 15 is held operated by circuit through contact S3 and resistance 85. Just as they are fully opened S3 breaks its circuit so that magnet valve 15 is deenergized, opening the large cylinder of motor RM to exhaust if switches 16 are open. However, if the person has not yet left the rear doorway or the rear step, so that one or more switches 16 are closed, current may still flow to magnet valve 15 from wire 81 through switch PS from the circuit previously traced to S1 and from thence to the treadle switches and through them and winding of magnet valve 15 to ground. Thus the rear door does not yet close. As soon, however, as the rear treadles are cleared and all switches 16 are open, the rear doors begin to close. As this happens S3 again makes, but magnet valve 15 is not operative because of the presence of resistance 85 in its circuit. Thus the doors continue to close and go to fully closed position in normal operation, unless they strike an object so that one or more of switches 13 are closed.

When one or more switches 13 are thus closed current again flows through switch S, but this time passes to wire 88, through switch 4, to wire 87, through either or both of switches 13, and by wire 86 to magnet valve 15 and ground. This operates the magnet valve supplying air to the large cylinder of the motor RM, causing the doors to start to open. They will continue their opening operation until fully opened because the current through resistance 85 is sufficient to hold magnet valve 15 energized until the doors are fully opened, when S3 breaks.

However, if the doors do not strike an object they come back to fully closed position, but switches 13 remain energized because of the supply of current to them from wire 81 to wire 90 to winding of magnet valve 89, wire 88, switch 4, which is still closed, and wire 87. Thereafter, and before the speed of the vehicle has become sufficient for the electromotive force across the brush holders of armature 1 to lift relay 4, if a momentary contact is made at switch 13, current will momentarily flow from source 71 through fuse 72, switch 73, resistance 80, wire 81, wire 90, the solenoid of valve 89, wire 88, the contact disc of relay 4, wire 87, switch 13, wire 86, to the solenoid of valve 15 to the negative side of the current supply. This current not being limited by resistance 85, is sufficient to operate both the solenoids of valves 89 and 15 to their operative position. Once the solenoids have operated their valves to the operative position, the current flowing through them and resistance 85, as also described, is sufficient to hold both valves in the operative position until the circuit through resistance 85 is broken at contact S3 of switch RS by this switch reaching the door open position. Thus a momentary contact at switch 13 is sufficient to cause the doors RD to open to their full open position by operation of valve 15, to cause the application of the vehicle's brakes during the same period by the operation of valve 89, and to cut off the power from the traction motors by breaking of contact S2 of switch RS while the doors are open. At the low vehicle speeds at which these circuits are operative, the above results are sufficient to stop the vehicle at the same time that a person caught by the door RD will have been released. Switch 4 remains closed until the vehicle attains a predetermined speed, at which time winding 3 is energized to open switch 4, when switches 13 become dead.

It may be here noted that in the normal operation, where the application of the brakes closes switch 3, the winding of magnet valve 89 is short circuited so that it does not under these conditions operate. Switch 94 is provided at the operator's station so that current may be directly supplied to the treadle switches 16 to permit a passenger to get off at the rear doors in those cases where the operator does not open the front doors and hence this circuit is not made through SB.

Figure 9:
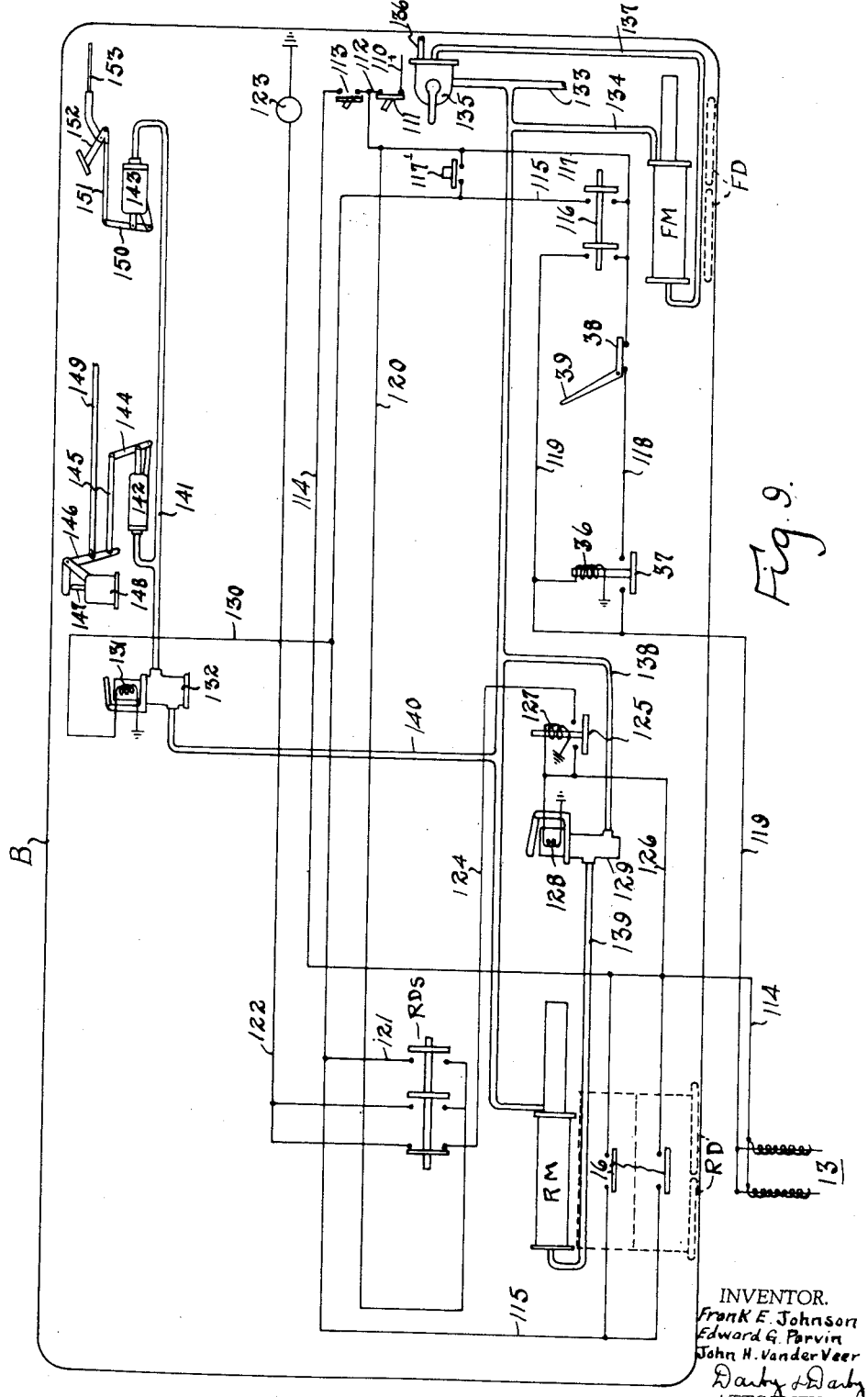
Fig. 9 is a diagrammatic layout of a system in accordance with this invention as applied to motor vehicles, such as buses.

The invention as applied to a motor vehicle, such as a bus, has been shown in more detail in Fig. 9. The bus is shown in outline at B. At 110 is a connection from the positive terminal of a suitable current source, the other terminal of which is grounded. Wire 110 extends to normally closed switch 111 which is connected by wire 112 to another normally opened switch 113. This switch is connected by wire 114 to the grounded windings 128 of the magnet valve 129, and 127 of the relay 125, and is only used when the operator wishes to hold the rear door open.

The normally closed switch 111 is connected by wire 117 to one contact of the door switch 116 operatively connected to the front doors FD. The corresponding contact is connected by wire 115 to one contact of each of the treadle switches 16. The other contact of these switches is connected by wires 114 and 126 to the grounded windings 128 of the magnet valve 129 and 127 of the relay 125. Wires 115 and 117 may be interconnected by a switch 117', which is normally open.

Wire 117 is also connected to another contact of door switch 116 and to one contact of switch 38 operated by gear shift lever 39. The other contact of this switch is connected by wire 118 to one contact of the relay switch 37. The remaining contact of door switch 116 is connected by wire 119 to one terminal of the grounded magnet winding 36 of the relay switch 37, the other contact of this relay switch and to one set of contacts of the door switches 13. The other contacts of the door switches 13 are connected by wires 114 and 126 to the grounded windings 128 of the magnet valve 129 and 127 of the relay 125.

Wire 117 is also connected by wire 120 to one contact of each of two pairs of normally opened contacts of the rear door switch RDS. One of the other contacts of this pair is connected by wire 121 to wire 115. The other contact of the other pair and one contact of a third pair, which are normally closed, are connected by wire 122 to ground through a signal device 123. The remaining contact of the normally closed pair is connected by wire 124 to one contact of the relay switch 125. This switch is operated by a grounded magnet winding 127 which is connected to the other contact of the switch and to the grounded winding 128 of the magnet valve 129. Wire 115 is connected by wire 130 to the grounded winding 131 of the magnet valve 132.

The door motors, which are again of the differential pressure fluid operated type, are shown at RM for operating the rear doors and at FM for operating the front doors. Pipe 133 extends from the pressure fluid source to the manually operated valve 135. This valve is provided with the exhaust connection 136 and the operating connection 137 to the large cylinder of the motor FM. Pipe 133 is connected to the small cylinder of the motor RM and by branch 134 to the small cylinder of the motor FM. Pipe 133 is also connected by the branch 138 to one of the ports of valve 129, the other port of which is connected by pipe 139 to the large cylinder of the motor RM. Pipe 133 is also connected by pipe 140 to one of the ports of valve 132. The other port is connected by pipe 141 to the brake interlock cylinder 142 and to the accelerator pedal interlock cylinder 143. The piston of the brake interlock is pivotally connected to a lever 144 which in turn is connected by the link 145 to the bell crank lever 146, which engages the stem 147 of the brake valve 148. The bell crank lever 146 is connected by a link 149 to the manual brake pedal. The piston of the accelerator interlock cylinder 143 is pivotally connected to a lever 150 which in turn is pivotally interconnected by the link 151 to the accelerator pedal 152. This accelerator pedal is connected by the rod 153 to the carburetor.

Before describing the operation of this system it is to be noted that front door switch 116, operated by the front doors FD, is shown in door closed position and moves to make the circuits connected thereto as soon as the front doors begin to open. The rear door switch RDS connected to the rear doors is of a type which operates as follows: As the rear doors begin to open the two normally opened pairs of contacts close. However the closed circuit at the left hand pair remains closed until the rear doors just complete their opening movement. At this time the circuit at these contacts breaks, while the circuit at the other pairs remains made. The reverse sequence of operation occurs as the rear doors close. As soon as they begin to close the left hand pair of contacts make and the right hand pairs remain made until the door just closes, when they break.

In describing the operation of the system it will be assumed that the bus is in motion and that the operator desires to bring it to a stop. He releases the accelerator pedal and depresses the brake pedal which, through the link 149, swings the bell crank lever 146 in a counter-clockwise direction. This operates valve 148 to supply air from the source to the brake cylinders through pipes, not shown, so that the brakes are applied. This brings the vehicle to a stop, it being assumed that the gear shift lever 39 is shifted to neutral position; switch 38 is then closed. The operator then manipulates valve 135 to supply air from pipe 133 to branch 137 and the large cylinder of motor FM. The front doors open and, as soon as they begin to open, door switch 116 closes.

Current flows from the source through wire 110, switch 111, wire 112, wire 117, right hand pair of contacts of switch 116, to wire 115, and by it to the treadle switches 16. It also flows through wire 130 and winding 131 to ground. This operates valve 132 so that air is supplied from pipe 133 to pipe 140 through valve 132 to pipe 141 and from this pipe to the cylinders 142 and 143. The air pressure in cylinder 142 prevents the release of valve 148 by the brake pedal. Thus, even if the brake pedal is released, the brakes remain applied because valve 148 is held in operated position. Likewise, the supply of air to cylinder 143 prevents depression of the accelerator pedal 152 so that the engine may not be speeded up. Current also flows from wire 117 through the left hand pair of contacts of switch 116, and by wire 119 to ground through the winding 36. This closes switch 37 and provides another circuit from wire 117 through switch 38, wire 118, and switch 37 to both the winding 36 and the wire 119 so that switches 13 are now alive. These switches will remain alive even if the left hand pair of contacts of switch 116 are opened, as they are when the front door is closed. These switches 13 and winding 36 remain energized until switch 38 is opened.

If there is a person at the rear door who wishes to alight, one or more of switches 16 are closed, with the result that current flows through wire 126 to ground through each of the windings 128 and 127. Thus switch 125 is closed and magnet valve 129 is operated. The operation of magnet valve 129 supplies air through pipes 138 and 139 to the large cylinder of the motor RM, causing the rear doors to begin to open. The closing of switch 125 sets up a holding circuit for itself and for the winding 128 from wire 117 through wire 120, the middle pair of contacts of switch RDS to wire 122 and through the left hand pair of contacts of switch RDS to wire 124. Current is also supplied to the signal device 123, indicating to the operator that the rear doors have begun to open. The right hand pair of contacts of switch RDS also supply current from wire 120 to wire 115 so that magnet valve 132 remains operated and current is supplied to the treadle switches 16. The doors continue their opening movement until fully opened. Just as they complete their opening movement the left hand pair of contacts of switch RDS open. This breaks the holding circuit to winding 127 so that switch 125 opens and magnet winding 128 is deenergized if the treadle switches 16 are open. These switches will open when the passenger is clear of the treadle on the step. The deenergization of winding 128 closes valve 129 so that the large cylinder of motor RM is open to exhaust and it begins to move the rear doors to closed position. They will completely close if they do not strike an object. Just as they completely close the two right hand pair of contacts of switch RDS open, the left hand pair having closed as soon as the door started to close. The opening of the right hand pairs deenergizes the signal device 123 and breaks the circuit to the winding 131. Thus valve 132 will close, opening line 141 to exhaust, and releasing the brake and accelerator interlocks. However, if the door strikes an object in closing either of switches 13 closes so that current flows from wire 119, which is still alive, to wire 114 and from it by wire 126 to energize windings 128 and 127.

Thus the valve 129 connects pipes 138 and 139 and motor RM opens the doors until they are fully opened, at which time the left hand pair of contacts of switch RDS open, breaking the holding circuit to the windings 127 and 128. The doors again begin to close. After the doors are fully closed, and the brakes and accelerator are released, and the front doors are fully closed, the operator may start the bus in motion. However, switches 13 remain energized until switch 38 is opened, which occurs when the operator shifts from low gear to second gear. Until this occurs the rear doors may open if anyone is caught in them to close switches 13. In this case current will flow from wire 117, through switch 38, wire 118, switch 37, wire 119, either switch 13, wire 114, and by wire 126 to the windings 127 and 128 to cause the rear doors to open. As soon as the rear doors begin to open the right hand pairs of contacts of switch RDS make, supplying current to wire 115 and by wire 130 to winding 131 to apply the brakes and to lock the accelerator pedal. At the same time signal device 123 warns the operator that the rear doors are open.

However, if switches 13 are not closed up to the time switch 38 is opened, then the operator proceeds normally and the rear door switches become dead.

It is noted that switch 117' is provided so that the operator may open the rear doors if there is a person on them so that one of the switches 16 is closed even if he does not wish to open the front doors. Switch 113 is provided which, when closed by the operator, supplies current directly to the windings 127 and 128 so that he may open the rear doors even if there is no person standing on the treadles.

From the above description it will be apparent to those skilled in the art that the principles of this invention may be readily embodied in various systems without departure from the true scope of the invention. We do not, therefore, desire to be strictly limited to the disclosure as given for purposes of illustration, but rather to the scope of the appended claims.

What we seek to secure by United States Letters Patent is:

1. A door control system for vehicles including a door, motive means for operating the door, means for energizing the motive means to reverse the movement of the door if it strikes an object in closing, and means for automatically rendering the motive means ineffective after the door is closed and the vehicle has started.

2. A door control system for vehicles including a door, motive means for operating the door, means for energizing the motive means to reverse the movement of the door if it strikes an object in closing, and means for maintaining the energizing means operative for a limited period of time after the door is fully closed and the vehicle has started.

3. A door control system for vehicles including a door, motive means for operating the door, means for energizing the motive means to reverse the movement of the door if it strikes an object in closing, and means for rendering the energizing means ineffective upon the attainment of a predetermined condition incident to the movement of the vehicle.

4. A door control system for vehicles including a door, motive means for operating the door, means for energizing the motive means to reverse the movement of the door if it strikes an object in closing, and means for rendering the energizing means ineffective after the vehicle has begun to move.

5. A door control system for vehicles including a door, motive means for operating the door, means for energizing the motive means to reverse the movement of the door if it strikes an object in closing, and means for rendering the energizing means ineffective after the vehicle has attained a predetermined speed.

6. In a door operating system for vehicles, a door, a motor connected to the door for opening and closing it, energizing means for the motor including a control device mounted on the door for energizing the motor for reverse operation of the door should it strike an object in closing, and means for rendering the control device ineffective after the vehicle has begun to move.

7. In a door operating system for vehicles, a door, a motor connected to the door for opening and closing it, energizing means for the motor including a control device mounted on the door for energizing the motor for reverse operation of the door should it strike an object in closing, and means for rendering the control device ineffective after the vehicle attains a certain speed.

8. In a door operating system for vehicles, a door, a motor connected to the door for opening and closing it, energizing means for the motor including a control device mounted on the door for energizing the motor for reverse operation of the door should it strike an object in closing, and means for rendering the control device ineffective by an act incidental to the movement of the vehicle.

9. In a door operating system for vehicles, a door, a motor connected to the door for opening and closing it, energizing means for the motor including a control device mounted on the door for energizing the motor for reverse operation of the door should it strike an object in closing, and means for maintaining the control device operative after the doors are closed and only until the attainment of a condition incident to the normal operation of the vehicle while in use.

10. In a door operating system for vehicles, a door, a motor connected to the door for opening and closing it, energizing means for the motor including a control device mounted on the door for energizing the motor for reverse operation of the door should it strike an object in closing, and means for rendering the control device inoperative when the vehicle has reached a predetermined speed.

11. In a door operating system for vehicles the combination with a propulsion motor for the vehicle, of a door, a motor for operating the door, means for controlling said motor including a reversing device mounted on the door, and means controlled by the propulsion motor for rendering the reversing device inoperative after the vehicle has begun to move.

12. In a door operating system for vehicles the combination with a propulsion motor for the vehicle, of a door, a motor for operating the door, means for controlling said motor including a reversing device mounted on the door, and means controlled by the propulsion motor for rendering the reversing device inoperative after the propulsion motor has attained a predetermined speed.

13. In a door operating system for a vehicle the combination with a propulsion motor for the vehicle, of a door, a motor for operating the door, means for controlling the motor including a reversing device mounted on the door, and means operated as an incident to the operation of the propulsion motor for rendering the reversing device inoperative after the vehicle is in motion.

14. In a door operating system for vehicles the combination with an electric propulsion motor for the vehicle, of a door, a motor for operating the door, means for controlling the motor including a reversing device mounted on the door, and means operated by the propulsion motor for maintaining the reversing device energized for a period of time after the vehicle begins to move.

15. In a door operating system for vehicles the combination with an electric propulsion motor for the vehicle, of a door, a motor for operating the door, means for controlling the motor including a switch mounted on the door, and means operated by the propulsion motor for deenergizing the switch after the vehicle attains a predetermined speed.

16. In a door operating system for a vehicle the combination with a propulsion motor for the vehicle, of a door, a motive device for operating the door, means for controlling the motive device including reversing mechanism, normally closed means operated by the propulsion motor for maintaining the reversing device operative and for rendering it inoperative when opened, and means for maintaining the means operated by the propulsion motor in open position after operation.

17. In a door operating system for a vehicle the combination with an electric propulsion motor for the vehicle, of a door, a motive device for operating the door, electro-pneumatic means for controlling the motive device including a reversing switch mounted on the door and the circuit therefor, a normally closed relay for maintaining the circuit to the reversing switch, said relay being operated by the electric propulsion motor, and being normally closed, and means for holding the relay open but being incapable of opening it.

18. In a door operating system for vehicles the combination with an electric propulsion motor for the vehicle, of a door, a motive device for operating the door, electro-pneumatic means for controlling the motive device including a reversing switch and a circuit therefor, a treadle switch including a circuit therefor, closure of the treadle switch completing a circuit to the electro-pneumatic control means to cause the door to open, and means operated by the electric propulsion motor for interrupting the circuit to the reversing switch after the vehicle has attained predetermined speed.

19. In a vehicle door operating system the combination comprising a door, a motive device for operating the door, means for controlling the motive device including a reversing switch mounted on the door and a circuit therefor, means for maintaining the motive device energized to fully open the door upon a momentary closing of said switch, and means for automatically deenergizing the circuit to said switch after the vehicle is in motion.

20. In a vehicle door operating system the combination comprising a door, a motive device for operating the door, means for controlling the motive device including a reversing switch mounted on the door and a circuit therefor, means for maintaining the motive device energized to fully open the door upon a momentary closing of said switch, and means for maintaining the circuit to said switch energized until the vehicle has attained a predetermined speed.

21. In a vehicle door operating system the combination with brake mechanism for the vehicle, and means for controlling the brake mechanism, of a door, a motor for operating the door, means for controlling said motor including a reversing switch mounted on the door, a circuit for said reversing switch, and means operated by an application of the brake mechanism for completing the circuit to said reversing switch.

22. In a vehicle door operating system the combination with brake mechanism and means for operating the brake mechanism, of a door, a motive device for operating the door, means for controlling the motive device including a reversing switch mounted on the door and a circuit therefor, means interconnecting the means for operating the brake mechanism and the reversing switch for maintaining the brake mechanism operated should the reversing switch be closed, and means for interrupting the circuit to the reversing switch as an incident to and result of the movement of the vehicle.

23. In a vehicle door operating system the combination with brake mechanism and means for operating the brake mechanism, of a door, a motive device for operating the door, means for controlling the motive device including a reversing switch mounted on the door and a circuit therefor, means interconnecting the means for operating the brake mechanism and the reversing switch for maintaining the brake mechanism operated should the reversing switch be closed, and means for interrupting the circuit to the reversing switch when the vehicle attains a predetermined speed.

24. In a vehicle door operating system the combination with a propulsion motor and brake mechanism for the vehicle and means for controlling the brake mechanism, of a door, a motor for operating the door, means for controlling the door motor including a reversing switch mounted on the door and a circuit therefor, means for operating the control means for the brake mechanism when the reversing switch is closed, and means for interrupting the circuit for the reversing switch when the propulsion motor reaches a predetermined speed.

25. In a door operating system for a vehicle having a pair of doors, a switch operated by one of the doors, motive means for operating the doors independently, means for controlling the door operating motors including a reversing switch mounted on one of the doors, and a circuit therefor including a switch operated by the other door whereby the circuit is completed to the reversing switch when that door opens, and means controlled by movement of the vehicle for interrupting the circuit to the reversing switch after the vehicle is in motion.

26. In a door operating system for vehicles, front and rear doors for the vehicle, motive means for operating said doors independently, a switch operated by the front door, means for controlling the rear door motor including a reversing switch and a circuit therefor, the switch operated by the front door being included in said circuit and completing it at that point when the front door opens, means for causing the rear door motor to fully open the door upon a momentary closing of the reversing switch, and means for automatically interrupting the circuit to the reversing switch shortly after the vehicle is in motion.

27. In a vehicle door system the combination comprising a vehicle door, a motor for operating the door, means controlled by the combined act of the vehicle operator and a passenger for causing the motor to open the door, means mounted on the door for causing the motor to open the door if it strikes an object in closing, and means controlled as an incident to the operation of the vehicle for rendering the means on the door ineffective at the end of a variable period of time.

28. In a door operating system for a vehicle the combination with a propulsion motor for the vehicle, of a door, a motor for operating the door, control means for the door motor including a reversing switch mounted on the door, a circuit for said switch, a signal device connected to said circuit whereby the door motor will open the door if the doors in closing strike an object and the signal device will be operated, and a switch in said circuit operated by the propulsion motor for interrupting the circuit at the expiration of a variable period of time after the vehicle begins to move.

29. In a door control system for vehicles the combination with a propulsion motor for the vehicle, of a door motor, control means for the door motor including reversing mechanism for causing the door motor to move towards door opening position if the door strikes an object in closing, and means controlled by the propulsion motor for rendering the reversing mechanism inoperative after the door is in door closed position.

30. In a door control system for vehicles the combination with a propulsion motor for the vehicle, of a door motor, control means for the door motor including reversing mechanism for causing the door motor to move towards door opening position if the door strikes an object in closing, means controlled by the propulsion motor for rendering the reversing mechanism inoperative after the door is in door closed position and additional control means which when operated actuates the means controlled by the propulsion motor to render the reversing means operative.

EDWARD G. PARVIN.
FRANK E. JOHNSON.
JOHN H. VANDER VEER.